United States Patent
Sridhar et al.

(10) Patent No.: US 11,929,850 B2
(45) Date of Patent: Mar. 12, 2024

(54) DYNAMIC ELIMINATION OF OLD IPV6 ADDRESSES FROM WLAN/BYOD/IOT DEVICES INDHCPV6 STATELESS MODE AFTER TRANSITIONING BETWEEN VLANS

(71) Applicant: Fortinet, Inc., Sunnyvale, CA (US)

(72) Inventors: PC Sridhar, Bangalore (IN); Pradeep Mohan, Bangalore (IN); Mohan Jayaraman, Bangalore (IN)

(73) Assignee: Fortinet, Inc., Sunnyvale, CA (US)

(*) Notice: Subject to any disclaimer, the term of this patent is extended or adjusted under 35 U.S.C. 154(b) by 200 days.

(21) Appl. No.: 17/364,794

(22) Filed: Jun. 30, 2021

(65) Prior Publication Data

US 2022/0321381 A1 Oct. 6, 2022

Related U.S. Application Data

(63) Continuation-in-part of application No. 17/218,769, filed on Mar. 31, 2021.

(51) Int. Cl.
| | | |
|---|---|---|
| *H04L 12/46* | (2006.01) | |
| *H04L 61/5014* | (2022.01) | |
| *H04L 61/5046* | (2022.01) | |
| *H04L 61/5053* | (2022.01) | |
| *H04L 101/659* | (2022.01) | |
| *H04L 101/681* | (2022.01) | |

(52) U.S. Cl.
CPC ...... *H04L 12/4679* (2013.01); *H04L 61/5014* (2022.05); *H04L 61/5046* (2022.05); *H04L 61/5053* (2022.05); *H04L 2101/659* (2022.05); *H04L 2101/681* (2022.05)

(58) Field of Classification Search
None
See application file for complete search history.

(56) References Cited

U.S. PATENT DOCUMENTS

2009/0285215 A1* 11/2009 Kaippallimalil ...... H04L 61/103
370/392
2012/0023207 A1 1/2012 Gandhewar
(Continued)

FOREIGN PATENT DOCUMENTS

| EP | 1357725 A2 * | 10/2003 | ............. H04L 45/02 |
|---|---|---|---|
| WO | WO-2012156171 A1 * | 11/2012 | ............. H04L 45/74 |
| WO | WO2014008427 | 1/2014 | |

OTHER PUBLICATIONS

"Reaction of IPV6 Stateless Address Autoconfiguration (SLAAC) to Flash-Renumbering Events (RFC8978)", F. Gont, Mar. 1, 2021 (Year: 2021).*

*Primary Examiner* — Jay L Vogel
(74) *Attorney, Agent, or Firm* — Office of Dorian Cartwright; Dorian Cartwright

(57) ABSTRACT

A Wi-Fi controller identifies a mismatch between a first prefix of a first IPv6 address for a data packet corresponding to a first VLAN on which the data packet was sent from the station to the access point, and a prefix of a second IPv6 address for a second VLAN from which the data packet was transmitted from the access point to the Wi-Fi controller. Responsive to the VLAN mismatch identification, the Wi-Fi controller transmits an RA to the station with a preferred lifetime of 0, wherein subsequent communications use the second IPv6 address.

7 Claims, 6 Drawing Sheets

(56) References Cited

U.S. PATENT DOCUMENTS

| | | | |
|---|---|---|---|
| 2012/0182994 A1* | 7/2012 | Dec | H04L 69/40 |
| | | | 370/392 |
| 2013/0028163 A1* | 1/2013 | Hsiao | H04W 4/06 |
| | | | 370/312 |
| 2016/0080318 A1* | 3/2016 | Sood | H04L 67/01 |
| | | | 709/203 |
| 2016/0112286 A1 | 4/2016 | Theogaraj | |
| 2019/0268762 A1* | 8/2019 | Bestermann | H04L 12/4641 |
| 2021/0092021 A1* | 3/2021 | Choukir | H04L 41/12 |
| 2022/0117015 A1 | 4/2022 | DeFoy et al. | |

\* cited by examiner

DYNAMIC ELIMINATION OF OLD IPV6 ADDRESSES FROM WLAN/BYOD/IOT DEVICES INDHCPV6 STATELESS MODE AFTER TRANSITIONING BETWEEN VLANS

CROSS-REFERENCE TO RELATED APPLICATIONS

This application claims priority as a continuation-in-part under 35 USC 120 to application Ser. No. 17/218,769, filed on Mar. 31, 2021, the contents of which are incorporated by reference herein in its entirety.

FIELD OF THE INVENTION

The invention relates generally to computer networking, and more specifically, to eliminating old IPv6 addresses from WLAN (wireless local access network) stations in DHCPv6 (Dynamic Host Configuration Protocol version 6) stateful mode after transitioning between VLANs (virtual local access networks).

BACKGROUND

Network access control in the era of IOTs (Internet of Things) and BYODs (Bring Your Own Devices) is commonly adopted security strategy in many organizations. This allows administrator to screen BYOD and IOT devices and enforce policies based on device type, operating system, and many other factors.

In this strategy, network segmentation a key action that is taken by the network access control devices either to quarantine potential threat devices or move client to appropriate VLAN (Virtual Local Access Network) segment based on device profile. This can be done by initially placing the devices on an isolation VLAN for screening the devices and based on the compliance, the clients get moved to either a VLAN segment to get access to defined network resource or gets to quarantine network segment if not complaint.

Problematically, IPv6 addresses carry lifetime for an address and client device would continue to use the address where needed until the preferred lifetime expires. This behavior has negative impact in network-based access control environment. In one scenario, when an IOT or BYOD client device enters wireless network, it is placed in an isolation VLAN, client gets a new IPv6 address for an isolation VLAN and would try to use the IPv6 address for data download and upload. The device data traffic is screened by the Wi-Fi controller and a policy change is triggered as defined to move the client to a different VLAN. In another scenario, an IOT or BYOD client gets infected by a malware, firewall could move the client to quarantine VLAN to avoid any impact on the production network.

Though the client is moved to new VLAN, client will try to retry or reestablish any active IPv6 (Internet Protocol v6) session since IPv6 address supports multiple IPv6 address on an interface, client device holds the IPv6 address of the old VLAN until the valid lifetime/preferred time expires. Due to change in VLAN, data traffic on old VLAN from the client would get dropped by the Wireless LAN controller. However, since wireless is half duplex and shared medium, Wi-Fi controller cannot block the client from using the airtime which is critical for performance in high dense networks.

Therefore, what is needed is a robust technique for eliminating old IPv6 addresses for quarantined stations after transitioning between VLANs, in stateless mode.

SUMMARY

These shortcomings are addressed by the present disclosure of methods, computer program products, and systems for eliminating old IPv6 addresses for quarantined stations after transitioning between VLANs, in stateless mode.

In one embodiment, a Wi-Fi controller identifies a mismatch between a first prefix of a first IPv6 address for a data packet corresponding to a first VLAN (virtual local access network) on which the data packet was sent from the station to the access point, and a prefix of a second IPv6 address for a second VLAN from which the data packet was transmitted from the access point to the Wi-Fi controller. A DHCP server assigned the first IPv6 address to the station for the first VLAN and assigned the second IPv6 address to the second for the second VLAN. The access point moved the data packet from the first VLAN to the second VLAN responsive to moving the station from the first VLAN to the second VLAN.

In another embodiment, responsive to the VLAN mismatch identification, transmit an RA to the station with a preferred lifetime of 0, wherein subsequent communications use the second IPv6 address.

Advantageously, both network performance and computer hardware performance are improved by eliminating wasteful data packet traffic from a station over an old IPv6 address after transitioning.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for eliminating old IPv6 addresses for quarantined stations after transitioning between VLANs, in stateless mode.

One of ordinary skill in the art will recognize many additional variations made possible by the succinct description of techniques below. For example, Wi-Fi log evens are referred to throughout merely for the sake of clarity and conciseness, although the techniques disclosure herein can be extended to outcome events to, for instance, wired networks, security and SD-WAN.

I. Systems for IPv6 Address Elimination from WLAN Stations (FIGS. 1-2)

Figure 1:
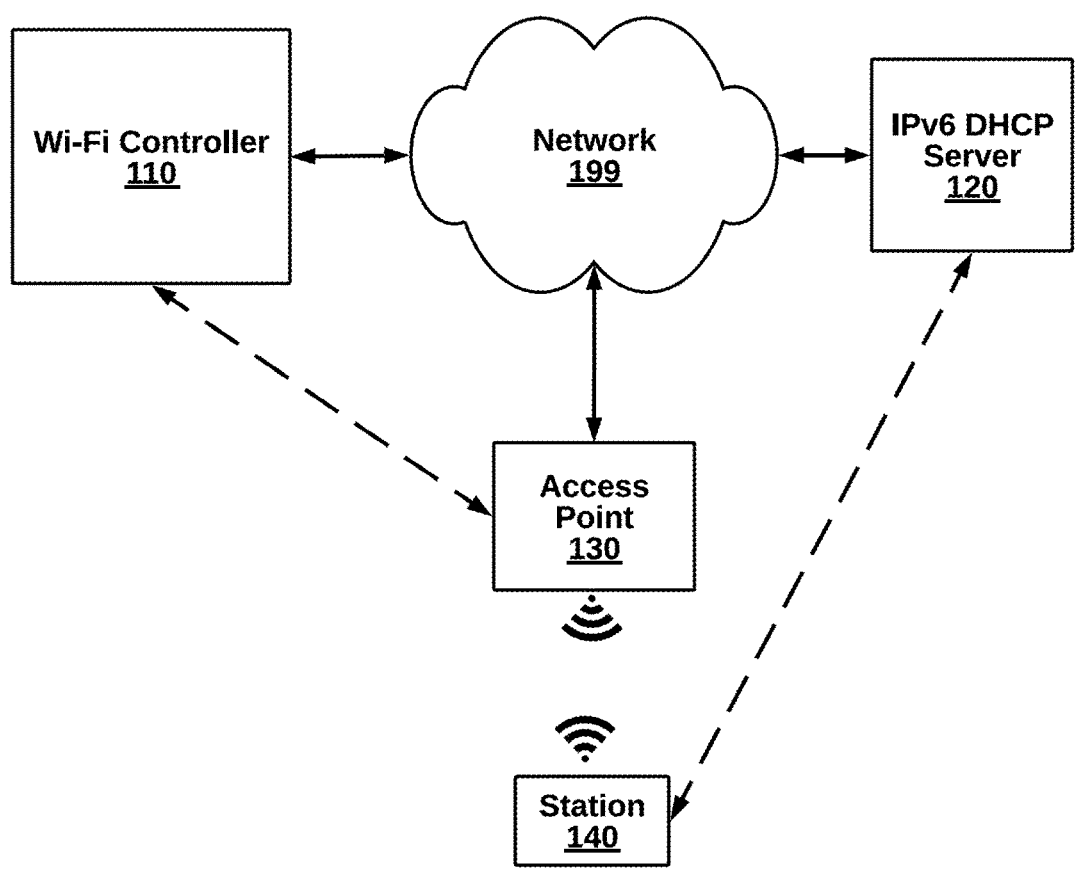
FIG. 1 is a high-level illustration of a system for IPv6 address elimination from WLAN stations after transitioning between VLANs, in stateless mode, according to an embodiment.
Figure 2:
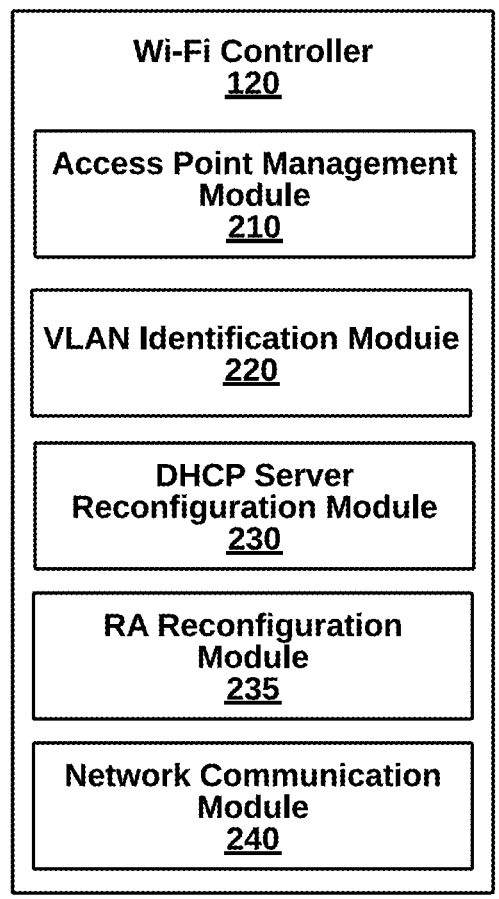
FIG. 2 is a more detailed illustration of a Wi-Fi controller of the system of FIG. 1, according to an embodiment.

FIG. 1 is a high-level illustration of a system for IPv6 address elimination from WLAN stations in stateless mode after transitioning between VLANs, according to an embodiment. The system 100 includes, in part, a Wi-Fi controller 110, an IPv6 DHCP server 120, an access point 130 and a station 140. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 6.

The components of the system 100 are coupled in communication over a network 199. Preferably, the Wi-Fi controller 110, the DHCP server 120 and the access point 130 are connected to the data communication system via hard wire. Other components, such as the station 140 are connected indirectly via wireless connection. The network 199 can be a data communication network such as the Internet, a WAN, a LAN, WLAN, a cellular network (e.g., 3G, 4G, 5G or 6G), or a hybrid of different types of networks. Various data protocols can dictate format for the data packets. An IPv6 data packet is represented as eight groups of four hexadecimal digits, each group representing 16 bits and separated by colons, and includes both the source address of a sending host and a destination address of a receiving host. The IPv6 address identifies a prefix followed a host. A prefix can be the first 64 bits indicated by /64 of the IPv6 address and identify a VLAN, for example, VLAN10 prefix of 2027::/64 for first IPv6 address 2027::897e:9d4d:f0d4:97cf and VLAN20 prefix of 2032::/64 for second IPv6address 2032::e537:9a3:90ec:9783.

In one embodiment, the Wi-Fi controller 110 recognizes that the station 140 is continuing to use a first VLAN after it has been transitioned to a second VLAN. In one example, stations are placed into a quarantine VLAN when onboarding for certain restrictions prior to being moved to a non-quarantine VLAN for regular operations. In another example, stations associated with suspicious activity or policy violations on a non-quarantine VLAN are subjugated to a quarantine VLAN. Other implementation-specific examples can also result in multiple IPv6 addresses, at least one of which is undesirable, within the scope of the present disclosure.

Figure 3:
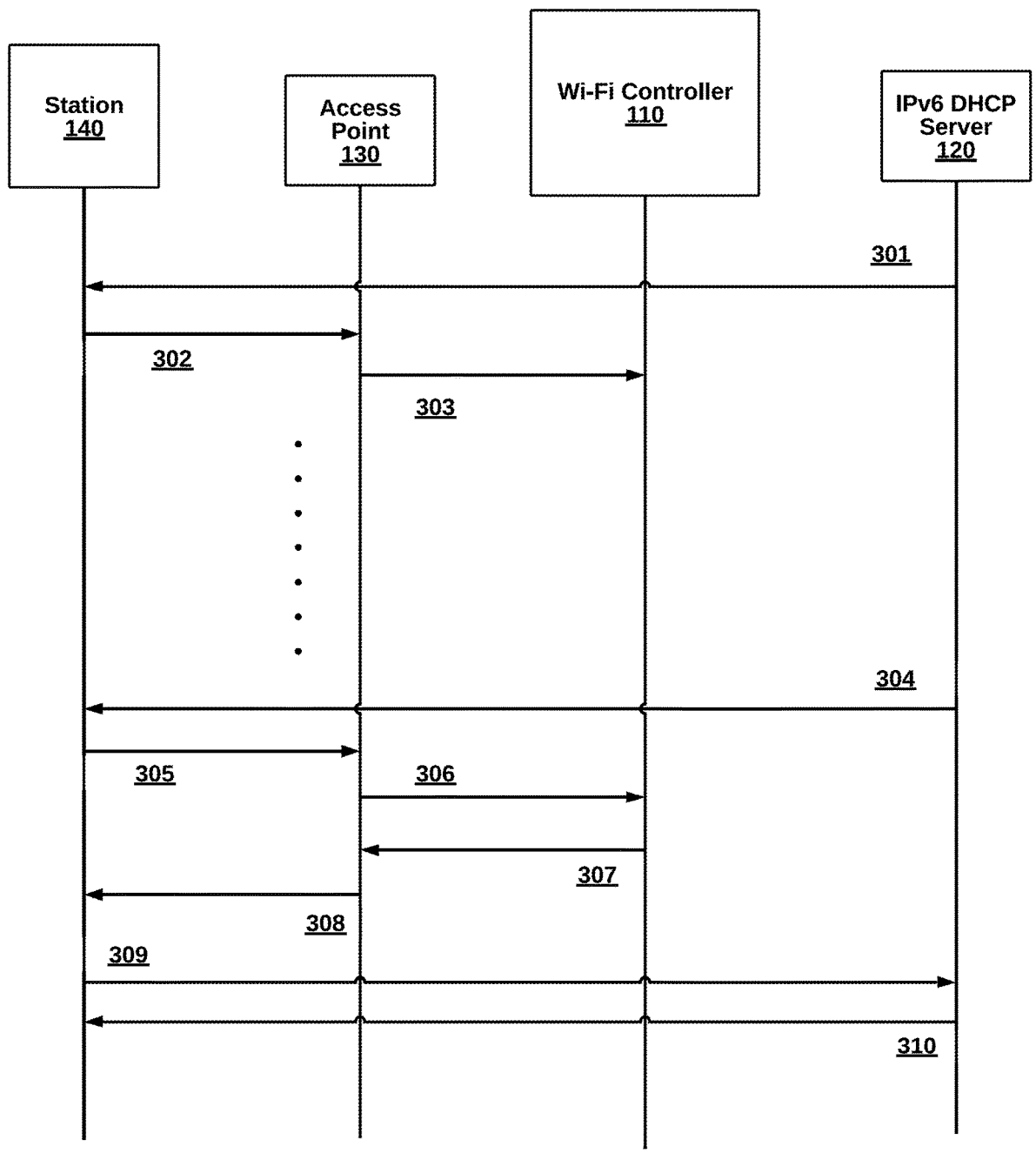
FIG. 3 is an interaction diagram illustrating a sequence of network exchanges between the components of FIG. 1, according to some embodiments.

In more detail, as shown in the sequence of interactions in FIG. 3, the access point 130 notifies the Wi-Fi controller 110 of which stations are assigned to which VLANs, or vice versa in other embodiments. Each VLAN (or subnet) is associated with a common prefix. An initial IPv6 address is formed from RAs in view of the first VLAN (e.g., 301) and an updated IPv6 address is formed from RAs in view of the second VLAN (e.g., 304). Station communication over the first VLAN is monitored by the Wi-Fi controller 110 (e.g., 305,306). When the access point 130 forwards data packets received by the station 140 on the second VLAN due to the transition the first prefix remains (e.g., 302,303), and a mismatch is identified. In response, the Wi-Fi controller 110 remotely triggers the DHCP server 120 to quiet the first IPv6 number by initiating a rebind process that sets a valid lifetime to zero. A reconfigure packet is unicast to the station 140 through the access point 130 over the first VLAN using the first prefix (e.g., 307,308), causing the station 140 to send a rebind request to the DHCP server 110 (e.g., 309). An ACK frame sent back from the DHCP server 110 to the station 140 ends use of the first IPv6 address (e.g., 310). In other embodiments, several access points with additional access points can be subject to the same monitoring and reconfiguration.

More generally, again in reference to FIG. 1, the Wi-Fi controller 110 manages and coordinates several access points. Furthermore, stations can be tracked as they are handed-off between different access points of a Wi-Fi network. Virtual cell implemented by the Wi-Fi controller 110 proliferates the same SSID (Service Set Identifier) among access points for seamless and transparent transitions for stations between access points. Additionally, virtual port maintains a unique SSID for the same station among access points for uniform policy application to a particular station or user. To do so, packets from the different points around the Wi-Fi network can be forwarded to the Wi-Fi controller 110 for uniform policy application.

The IPv6 DHCP server 120 assigns and manages IPv6 addresses to network devices. In a stateful mode, the station 140 and other network devices receive IPv6 addresses from the DHCP server. In a stateless mode, network devices generate their own IPv6 addresses based on RAs (router advertisements). A valid lifetime is controlled by IPv6 DHCP server 120 in stateful mode. In the present discussion, the DHCP server 120 may send anIPv6 RA advertisement including prefixes 2027::/64 for a first VLAN and 2032::/64 for a second VLAN, both with valid lifetimes and preferred lifetimes. Upon rebinding, the valid lifetime can be set to zero, to deprecate or effectively end use of the IPv6 address. In a different embodiment, the preferred lifetime can be set to 0 for older prefix 2027::/64.

The access point 130 provides wireless access for the station 140 to the backbone network with a Wi-Fi or other wireless interface and an Ethernet or other wired interface. Based on a network policy, the access point 130 sets an initial VLAN (e.g., a quarantine VLAN), wherein policies are applied to the station 140 before moving it to the standard VLAN (e.g., a non-quarantine VLAN). The access point 130 can apply local policies in coordination with network-wide policies applied by the Wi-Fi controller 110.

The station 140, when within range of the access point 130, can request access to the Wi-Fi network by responding to a beacon. Also, RAs from the IPv6 DHCP server 120 can be used to assign IPv6 addresses. The station 140 can be a mobile client, for instance, a smartphone, a tablet computer, or a smart appliance.

FIG. 2 is a more detailed illustration of the Wi-Fi controller 110 of the system 100 of FIG. 1. The Wi-Fi controller 110 includes an access point management module 210, a VLAN identification module 220, a DHCP reconfiguration module 230, a RA (router advertisement) reconfiguration module 235, and a network communication module 240. The modules can be implemented in source code stored in non-transitory memory executed by a processor. Alternatively, the modules can be implemented in hardware with microcode. The modules can be singular or representative of functionality spread over multiple components.

The access point management module 210 can receive data packets from an access point providing Wi-Fi access to a station over a plurality of VLANs, wherein the station is in stateful mode.

The VLAN identification module 220, in an embodiment, identifies a mismatch between a first prefix of a first IPv6 address for a data packet corresponding to a first VLAN on which the data packet was sent from the station to the access point, and a prefix of a second IPv6 address for a second VLAN from which the data packet was transmitted from the access point to the Wi-Fi controller. The DHCP server assigned the first IPv6 address to the station for the first VLAN and assigned the second IPv6 address to the second for the second VLANN. The access point moved the data packet from the first VLAN to the second VLAN responsive to moving the station from the first VLAN to the second VLAN.

The DHCP reconfiguration module 230 can, responsive to the VLAN mismatch identification, transmit a DHCP reconfiguration packet to the station using the first VLAN. The DHCP reconfiguration packet causes the station to transmit a rebind packet to the DHCP server. The rebind packet causes the DHCP server to transmit an ACK frame on the first VLAN setting the valid lifetime for the first IPv6 address to zero.

The RA reconfiguration module 235 can, responsive to the VLAN mismatch identification, transmit an RA to the station with a preferred lifetime of 0, wherein subsequent communications use the second IPv6 address. In one embodiment, the DHCP reconfiguration module 230 handles stateful stations and the DHCP reconfiguration module 235 handles stateless stations.

The network communication module 240 may include channel communication peripherals, such as protocol software, transceivers, antenna, input/output ports, and the like.

II. Methods for Eliminating IPv6 Addresses from WLAN Stations (FIGS. 4-5)

Figure 4:
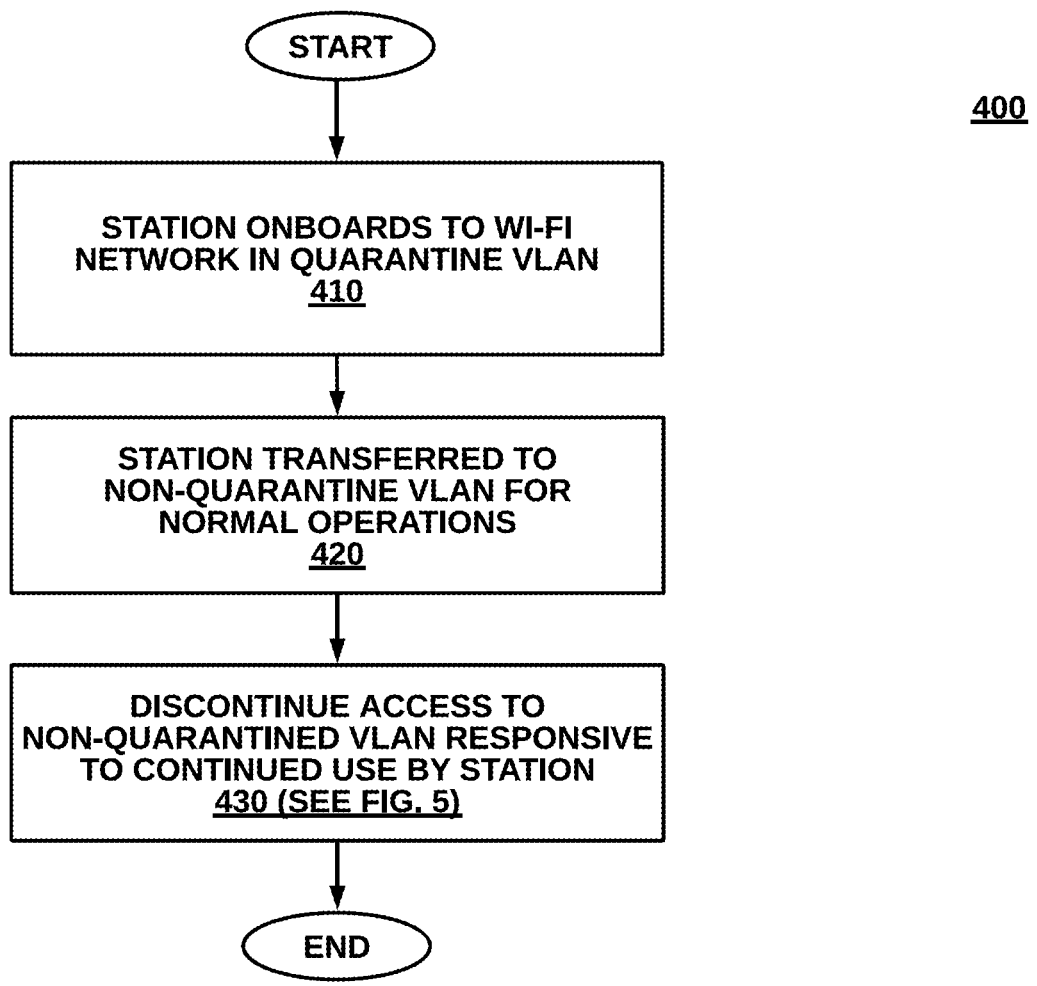
FIG. 4 is a high-level flow diagram illustrating a method for monitoring VLAN usage of quarantined stations in stateless mode that have been transitioned from a non-quarantined VLAN, according to one preferred embodiment.

FIG. 4 is a high-level flow diagram illustrating a method for monitoring VLAN usage of quarantined stations in stateless mode, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a station onboards to a Wi-Fi network in a quarantine VLAN for policy applications. At step 420, the station is transferred to a non-quarantine VLAN for normal operations. At step 430, responsive to the station continuing to make use of the non-quarantine VLAN, the Wi-Fi station discontinues access to the non-quarantine VLAN, as is described in more detail with reference to FIG. 5.

Figure 5:
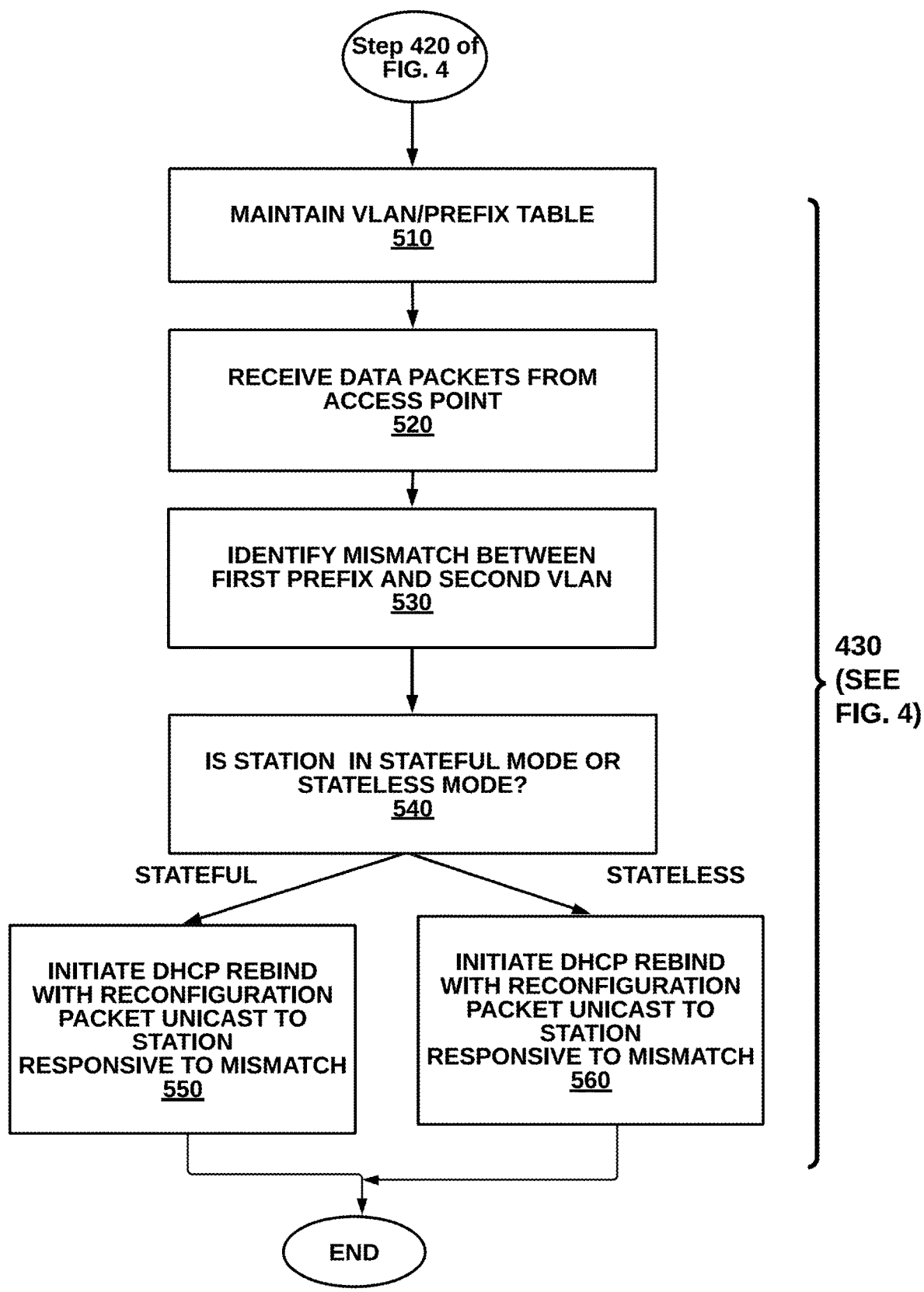
FIG. 5 is a more detailed flow diagram illustrating the step of eliminating IPv6 addresses from WLAN stations for the method of FIG. 4, according to one embodiment.

Turning to FIG. 5, at step 510, a table mapping VLANs to prefixes is maintained by the Wi-Fi controller. The table is updated when stations are moved in and out of quarantine, and when stations change VLANs for other reasons.

At step 520, data packets are received at a Wi-Fi controller from an access point providing Wi-Fi access to a station over a plurality of VLANs, wherein the station is in a stateful mode. Policies can be applied to data packets based on device, user, network state, protocol, and the like.

At step 530, a mismatch is identified from the table between a first prefix of a first IPv6 address for a data packet corresponding to a first VLAN on which the data packet was sent from the station to the access point, and a prefix of a second IPv6 address for a second VLAN from which the data packet was transmitted from the access point to the Wi-Fi controller. A DHCP server assigned the first IPv6 address to the station for the first VLAN and assigned the second IPv6 address to the second for the second VLAN. The access point moved the data packet from the first VLAN to the second VLAN responsive to moving the station from the first VLAN to the second VLAN.

At step 540, responsive to the VLAN mismatch identification, it is determined whether the station is in stateless mode or stateful mode. If determined to be in stateless mode, an RA is transmitted to the station with a preferred lifetime of 0, wherein subsequent communications use the second IPv6 address, at step 550. If determined to be in stateless mode, a DHCP reconfiguration packet is transmitted to the station using the first VLAN. The DHCP reconfiguration packet causes the station to transmit a rebind packet to the DHCP server. The rebind packet causes the DHCP server to transmit an ACK frame on the first VLAN setting the valid lifetime for the first IPv6 address to zero, at step 560. In one embodiment, stateless or stateful mode is already known and step 540 is not necessary.

III. Generic Computing Device (FIG. 6)

Figure 6:
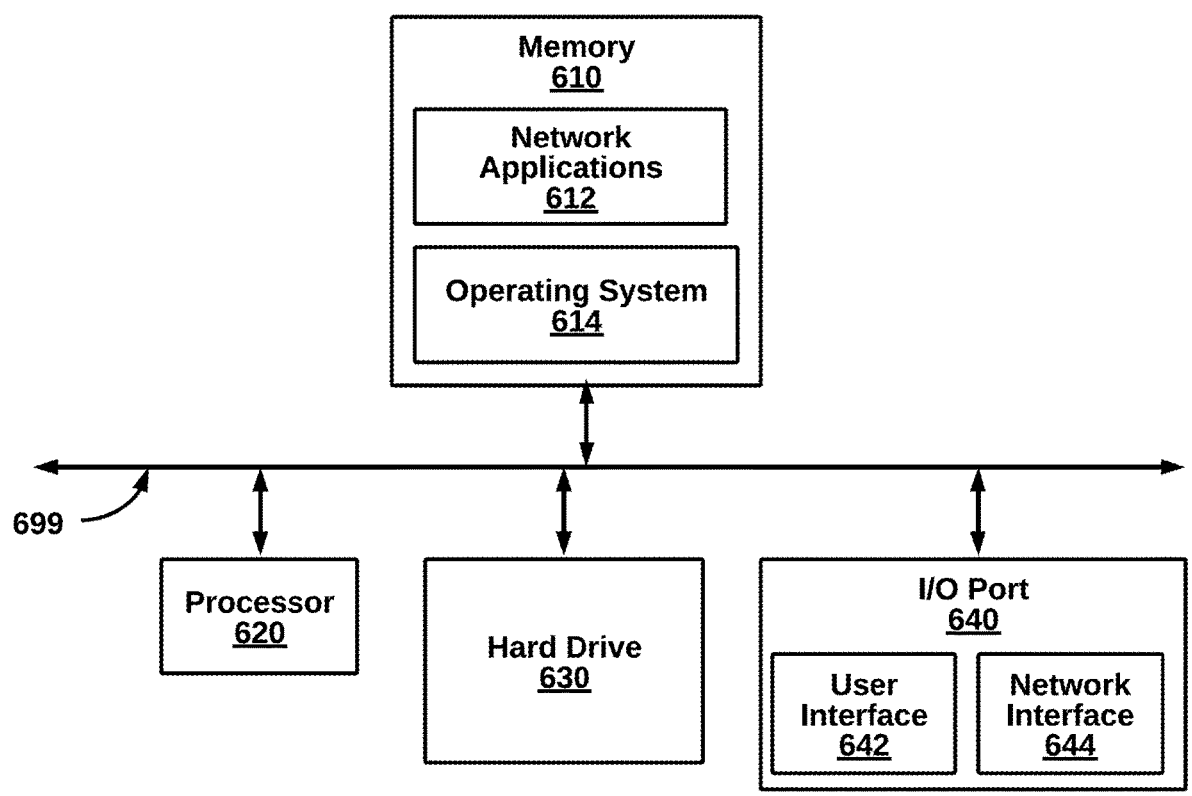
FIG. 6 is an example of a computing environment, according to an embodiment.

FIG. 6 is a block diagram illustrating an example computing device 600 for use in the system 100 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A Wi-Fi controller coupled to a Wi-Fi network, for eliminating old IPv6 addresses for quarantined stations in stateless mode after transitioning between VLANs (virtual local access networks), the network device comprising: a processor; a network interface communicatively coupled to the processor and to the Wi-Fi network; a memory, storing: an access point management module to receive data packets from an access point providing Wi-Fi access to a station over a plurality of VLANs, wherein the station is in stateless mode; a VLAN identification module to identify a mismatch between a first prefix of a first IPv6 address for a data packet corresponding to a first VLAN on which the data packet was sent from the station, and a prefix of a second IPv6 address for a second VLAN, wherein the first VLAN comprises a quarantine VLAN for stations onboarding to the Wi-Fi network and the second VLAN comprises a non-quarantine VLAN; and an RA (router addresser) reconfiguration module to, responsive to the VLAN mismatch identification, transmits an RA to the station with valid lifetime and a preferred lifetime of 0, wherein the data packet is moved from the first VLAN to the second VLAN responsive to transitioning the station from the first VLAN to the second VLAN, and wherein subsequent communications use the second IPv6 address.

2. The Wi-Fi controller of claim 1, wherein the station transmits subsequent traffic on the second VLAN and discontinues transmitting traffic on the first VLAN.

3. The Wi-Fi controller of claim 1, wherein the access point management module stores a table of IPv6 prefixes and corresponding VLANs for a plurality of access points managed by the Wi-Fi controller.

4. The Wi-Fi controller of claim 1, wherein a valid lifetime for the first IPv6 address has not expired when the access point moves the station from the first VLAN to the second VLAN.

5. The Wi-Fi controller of claim 1, wherein an access point manager maintains a table mapping a plurality of VLANs to corresponding prefixes of IPv6 addresses.

6. A method in a Wi-Fi controller coupled to a Wi-Fi network, for eliminating old IPv6 addresses for quarantined stations in stateless mode after transitioning between VLANs (virtual local access networks), the method comprising the steps of: receiving data packets from an access point providing Wi-Fi access to a station over a plurality of VLANs, wherein the station is in a stateless mode; identifying a mismatch between a first prefix of a first IPv6 address for a data packet corresponding to a first VLAN on which the data packet was sent from the station, and a prefix of a second IPv6 address for a second VLAN, wherein the first VLAN comprises a quarantine VLAN for stations onboarding to the Wi-Fi network and the second VLAN comprises a non-quarantine VLAN; and responsive to the VLAN mismatch identification, transmit an RA to the station with valid lifetime and a preferred lifetime of 0, wherein the data packet is moved from the first VLAN to the second VLAN responsive to transitioning the station from the first VLAN to the second VLAN, and wherein subsequent communications use the second IPv6 address.

7. A non-transitory computer-readable media in a Wi-Fi controller coupled to a Wi-Fi network for, when executed by a processor, eliminating old IPv6 addresses for quarantined stations in stateless mode after transitioning between VLANs (virtual local access networks, the method comprising the steps of: receiving data packets from an access point providing Wi-Fi access to a station over a plurality of VLANs, wherein the station is in a stateless mode; identifying a mismatch between a first prefix of a first IPv6 address for a data packet corresponding to a first VLAN on which the data packet was sent from the station, and a prefix of a second IPv6 address for a second VLAN, wherein the first VLAN comprises a quarantine VLAN for stations onboarding to the Wi-Fi network and the second VLAN comprises a non-quarantine VLAN; and responsive to the VLAN mismatch identification, transmit an RA to the station with valid lifetime and a preferred lifetime of 0, wherein the data packet is moved from the first VLAN to the second VLAN responsive to transitioning the station from the first VLAN to the second VLAN, and wherein subsequent communications use the second IPv6 address.

* * * * *